United States Patent [19]

Ramachandran et al.

[11] Patent Number: 5,229,089
[45] Date of Patent: Jul. 20, 1993

[54] RECOVERY OF FLAMMABLE MATERIALS FROM GAS STREAMS

[75] Inventors: Ramakrishnan Ramachandran, Allendale; Arthur I. Shirley, Piscataway, both of N.J.

[73] Assignee: The BOC Group, Inc., New Providence, N.J.

[21] Appl. No.: 788,644

[22] Filed: Nov. 6, 1991

[51] Int. Cl.$^5$ ............................................. B01D 53/00
[52] U.S. Cl. ...................................... 423/210; 423/219; 423/245.1; 55/28
[58] Field of Search ............... 423/219, 245.3, 210, 423/245.1; 55/26, 28

[56] References Cited

U.S. PATENT DOCUMENTS

| | | | |
|---|---|---|---|
| 3,797,201 | 3/1974 | Tamura | 55/62 |
| 4,013,429 | 3/1977 | Sircar et al. | 55/33 |
| 4,070,164 | 1/1978 | Miwa et al. | 55/26 |
| 4,305,734 | 12/1981 | McGill | 55/25 |
| 4,421,530 | 12/1983 | Dalton, Jr. et al. | 55/26 |
| 4,734,273 | 3/1988 | Haskell | 423/219 |
| 4,813,980 | 3/1989 | Sircar | 55/26 |
| 4,859,434 | 8/1989 | Roberts et al. | 423/219 |
| 4,963,339 | 10/1990 | Krishnamurthy et al. | 423/437 |
| 5,089,034 | 2/1992 | Markovs et al. | 55/28 |
| 5,090,973 | 2/1992 | Jain | 55/26 |
| 5,096,470 | 3/1992 | Krishnamurthy | 55/26 |

FOREIGN PATENT DOCUMENTS

2103593 2/1983 United Kingdom ............ 423/245.3

Primary Examiner—Gary P. Straub
Assistant Examiner—Timothy C. Vanoy
Attorney, Agent, or Firm—Coleman R. Reap; Larry R. Cassett

[57] ABSTRACT

A process for separating methane from an oxygen-containing gas mixture which contains methane at a concentration greater than the upper explosive gas mixture limit by pressure swing adsorption without producing an explosive gas mixture. The process includes the steps of feeding the gas mixture into an adsorber which contains an adsorbent which preferentially adsorbs methane until the desired production pressure is attained in the adsorber and then stopping the flow of feed gas into the adsorber and charging methane product gas at the production pressure cocurrently into the adsorber while simultaneously withdrawing nonadsorbed product gas from the nonadsorbed product end of the adsorber. The desorbed product stream is enriched in methane relative to the feed stream and the concentration of methane in the nonadsorbed product stream is less than the minimum flammable mixture concentration.

37 Claims, 2 Drawing Sheets

RECOVERY OF FLAMMABLE MATERIALS FROM GAS STREAMS

BACKGROUND OF THE INVENTION

1. Field of the Invention

This invention relates to the separation of the components of a gas mixture by adsorption and more particularly to the high purity recovery of the more readily adsorbed gas component and the less readily adsorbed component products of a pressure swing adsorption (PSA) process.

2. Description of the Related Art

There is often a need to recover the constituents of a gas mixture in high purities. For example, when a flammable gas, such as methane, is to be recovered from a gas stream which contains methane and oxygen, either in the presence or absence of other gaseous constituents, it is often desirable and usually necessary to separate the mixture into a nonflammable methane-rich component and a nonflammable methane-lean component. The nonflammable methane-rich component is a mixture of methane and oxygen which is too rich in methane and too lean in oxygen to constitute a flammable mixture and the nonflammable methane-lean component is a mixture of methane and oxygen which is too lean in methane and too rich in oxygen to constitute a flammable mixture.

Potentially flammable gas mixtures are formed in nature or are produced in industrial processes. For example flammable gas mixtures are formed by the release of methane from landfills or from coal when the released methane combines with air to produce a mixture containing about 6% to 14% by volume methane. Flammable gas mixtures are produced in industry by the release of methane from coal during mining or by the release into the air of various other hydrocarbons, such as ethylene, butene, etc. These compounds are used in various chemical reactions, such as polymerization.

A number of methods are available for separating the constituents of the above-described gas mixtures. A highly effective method for separating the constituents of gaseous mixtures is cryogenic distillation. This technique is very useful for large volume separation plants in which the feed gas being treated does not contain mixtures of oxygen and flammable gases. However, if a mixture of a flammable gas and an oxygen-containing gas, such as air, is cryogenically separated in a distillation column into substantially pure flammable gas and oxygen streams, a flammable mixture will be formed at some point within the column, thereby creating an explosion hazard. Accordingly, cryogenic separation cannot be safely used to separate mixtures of oxygen and flammable gases.

Cryogenic separation can be used to separate the flammable gas from the other constituents of a gaseous mixture which also contains oxygen, if the oxygen is first removed from the gas mixture. For example, the oxygen can be removed from the mixture by catalytic combustion of the oxygen and a portion of the flammable gas. This method of separation likewise has major drawbacks. Firstly, the oxidation is highly exothermic, and provision must be made for waste heat removal. Secondly, some of the flammable gas is used up in the combustion. It can readily be appreciated, therefore, that this method of flammable gas recovery can only be used when oxygen is present in the gas mixture in very small concentrations, such as, for example, concentrations of less than one volume percent.

Another procedure that has been considered for recovering flammable gases from oxygen-containing gas mixtures is adsorption. According to this procedure, the gas mixture is passed through an adsorbent which adsorbs the flammable gas in preference to the other components of the mixture. The flammable gas is generally recovered as the desorbed product stream and the other gases in the mixture are generally recovered as the nonadsorbed product stream. However, conventional adsorption procedures are not practical for the recovery of flammable gas from oxygen-flammable gas mixtures because when the process is optimized to produce high purity flammable gas, it is difficult to produce a nonadsorbed gas stream which contains the flammable gas at a concentration less than the lower flammable mixture limit.

U.S. Pat. No. 4,305,734, issued to McGill, discloses a process for separating flammable gases such as methane from flammable gas-air mixtures by passing the gas mixture through a bed of adsorbent which adsorbs the flammable gas in preference to air. The principal purification step of the disclosed Process comprises passing the feed mixture through the adsorption bed while simultaneously producing non-adsorbed gas from the adsorber. This step is followed by cocurrently flushing carrier gas from the adsorber with flammable gas and then recovering flammable gas from the adsorber by depressurization of the adsorber. Although this process may result in increased feed gas throughput, the purity of the desorbed product can be lower than is desired since the inlet region of the adsorber will contain a greater concentration of carrier gas when the flammable gas purge step begins.

U.S. Pat. No. 3,797,201, issued to Tamura, discloses the production of high purity desorbed and nonadsorbed gaseous products by a process which includes a step in which desorbed product is used to cocurrently purge the adsorber at the pressure at which the adsorption step is carried out and a step in which nonadsorbed product is produced while fresh feed is introduced into the adsorber.

U.S. Pat. No. 4,070,164, issued to Miwa et al., discloses the adsorptive separation of the components of a two gas component mixture. The process comprises four serially conducted steps, including feed gas pressurization without removal of nonadsorbed gas, cocurrent purge with desorbed product while nonadsorbed product is cocurrently removed from the adsorber, a first countercurrent depressurization and a second countercurrent depressurization.

U.S. Pat. No. 4,813,980, issued to Sircar, discloses a PSA process for the separation of a mixture of hydrogen and nitrogen from carbon dioxide. The process of this patent includes a high pressure co-current rinse of the bed with desorbed gas following the adsorption step.

U.S. Pat. No. 4,013,429, issued to Sircar et al., discloses the separation of nitrogen from air by a PSA process in which the bed is rinsed with desorbed nitrogen following the adsorption step. The effluent obtained during the rinse step may be added to the fresh air feed.

U.S. Pat. No. 4,963,339, issued to Krishnamurthy et al., discloses the production of high purity hydrogen and carbon dioxide from a gas mixture by a PSA process which includes the step of cocurrently purging the bed with desorbed product following a depressurization of the bed into an equalization tank.

Because of the desirable features of adsorption there is a need for an adsorption process which can simultaneously effect the efficient separation of gas mixtures into a high purity desorbed product stream and a nonadsorbed product stream which contains very little strongly adsorbed constituent. The present invention satisfies that need.

SUMMARY OF THE INVENTION

According to a broad aspect of the invention, a desired component of a gas stream is recovered in high purity by Pressure swing adsorption using an adsorbent which more strongly adsorbs the desired component than it adsorbs other components of the gas stream in a cycle which includes the steps (a) raising the pressure in the adsorber to the desired production pressure by introducing the feed mixture cocurrently into the adsorber, (b) introducing high purity desorbed product gas cocurrently into the adsorber (cocurrent purge or copurge) while simultaneously cocurrently withdrawing nonadsorbed product gas from the adsorber, (c) cocurrently partially depressurizing the adsorber, thereby producing expansion gas, and (d) further countercurrently depressurizing the adsorber, thereby producing high purity desorbed product gas. The high purity desorbed product gas that is cocurrently introduced into the adsorber in step (b) may be gas obtained from step (d) of previous cycles of the process or it may be obtained from an external source.

The gas stream being treated may be any gas mixture which contains a component that is more strongly adsorbed onto the adsorbent than are other components of the gas mixture. For example, the process may be applied to the separation of the components of air. The process is particularly suited for the recovery of a flammable component from a mixture containing, in addition to the flammable component, oxygen or an oxygen containing gas mixture, such as air, without producing flammable gas mixtures.

In a preferred embodiment of the invention, step (a) is preceeded by one or more partial pressurizations of the adsorber, effected by countercurrently introducing a gas which is not readily adsorbed by the adsorbent into the adsorber. The less readily adsorbed gas may be expansion gas obtained from step (c) of previous cycles of the process, or it may be the nonadsorbed product gas from step (b) of previous cycles of the process, or it may be obtained from an external source. When multiple partial pressurization stages are incorporated into the process cycle, expansion gas (cocurrent depressurization gas) from step (c) of Previous cycles of the process (or from an external source) may be used in the first stage partial pressurization (equalization) and nonadsorbed Product gas from step (b) of previous cycles of the process (or from an external source) may be used in the second stage partial pressurization (product backfill).

In the most preferred embodiment of the invention, the cycle comprises the steps of (1) partially pressurizing the adsorber by countercurrently introducing expansion gas into the adsorber, (2) further pressurizing the adsorber by countercurrently introducing nonadsorbed product gas into the adsorber, (3) pressurizing the adsorber to the desired production pressure by cocurrently introducing feed gas into the adsorber, (4) cocurrently introducing desorbed product gas into the adsorber while simultaneously cocurrently removing desorbed gas-depleted product gas from the adsorber, (5) partially depressurizing the adsorber by cocurrently withdrawing expansion gas from the adsorber, and (6) further depressurizing the adsorber by countercurrently withdrawing adsorbed gas from the adsorber, thereby regenerating the adsorbent in the adsorber and producing high purity desorbed gas.

When the process is used to recover a flammable gas from an oxygen-containing gas mixture, residual oxygen can be removed from the recovered flammable gas product stream by contacting the gas stream with an oxidation catalyst under combustion conditions, thereby effecting reaction between the oxygen and the flammable gas to produce water and other by-products, such as carbon dioxide or sulfur dioxide. Alternatively, the gas mixture can be contacted with hydrogen and an oxidation catalyst to produce water. The water and other by-products can be removed from the product stream by adsorption.

In a particularly preferred embodiment, the process is applied to the recovery of methane from a methane-air mixture. Residual oxygen contained in the methane product stream is removed by contacting the product stream with hydrogen in the presence of an oxidation catalyst, such as palladium. The water vapor produced by the catalytic oxidation is removed from the gas stream by contacting the gas stream with an adsorbent such as alumina or silica gel.

BRIEF DESCRIPTION OF THE DRAWINGS

The invention will be more clearly understood by reference to the following description of exemplary embodiments thereof in conjunction with the accompanying drawings, in which.

The same reference numerals are used to represent the same pieces of equipment in the various drawing figures. Only equipment, valves and lines necessary for an understanding of the invention have been included in the drawing figures.

DETAILED DESCRIPTION OF THE INVENTION

In the principle aspect of the invention a unique pressure swing adsorption cycle is provided which enables the system to produce relatively high purity desorbed product and nonadsorbed product gas streams. The process of the invention may be carried out in a single adsorption unit or a plurality of adsorption units, whichever is desired. In a single adsorption unit system, production of the separated gas products must be stopped during regeneration of the adsorption zone, whereas when a plurality of adsorption units are employed, one or more units can be in service producing purified gas while one or more other units are undergoing regeneration.

The adsorption units contain one or more adsorbents which selectively adsorb one or more of the components of the gas stream. The Particular adsorbent or adsorbents used will depend upon the composition of the gas stream being treated and the particular component or components that it is desired to adsorb from the feed gas stream. Suitable adsorbents include zeolite molecular sieves, carbon molecular sieves, activated carbon, and the like. In some cases it may be desirable to provide a guard bed containing silica or alumina upstream of the main adsorption units for the removal of water vapor from the feed gas.

The process of the invention can be advantageously used to separate any gas which is more strongly adsorbed in an adsorbent from other gases which are less strongly adsorbed in the adsorbent. However, the invention is particularly useful for separating a flammable gas from an oxygen-containing gaseous mixture in which the flammable gas is present at a concentration greater than the upper flammable limit for the gas mixture, since it permits the separation to be effected without the formation of a flammable or explosive mixture.

The term "flammable gas", as used in this description, means any gas which forms a flammable or explosive mixture with a combustion-supporting gas such as oxygen. Flammable gases which can be recovered by the process of the invention include carbon monoxide, volatile hydrocarbons, such as the lower aliphatic and aromatic hydrocarbons, substituted hydrocarbons, such as alcohols, ketones, ethers, mercaptans, etc.; and non-carbon gases, such as sulfur dioxide. The process is ideally suited for the separation of the lower hydrocarbons from oxygen, for example the separation of methane from methane-air mixtures.

Figure 1:
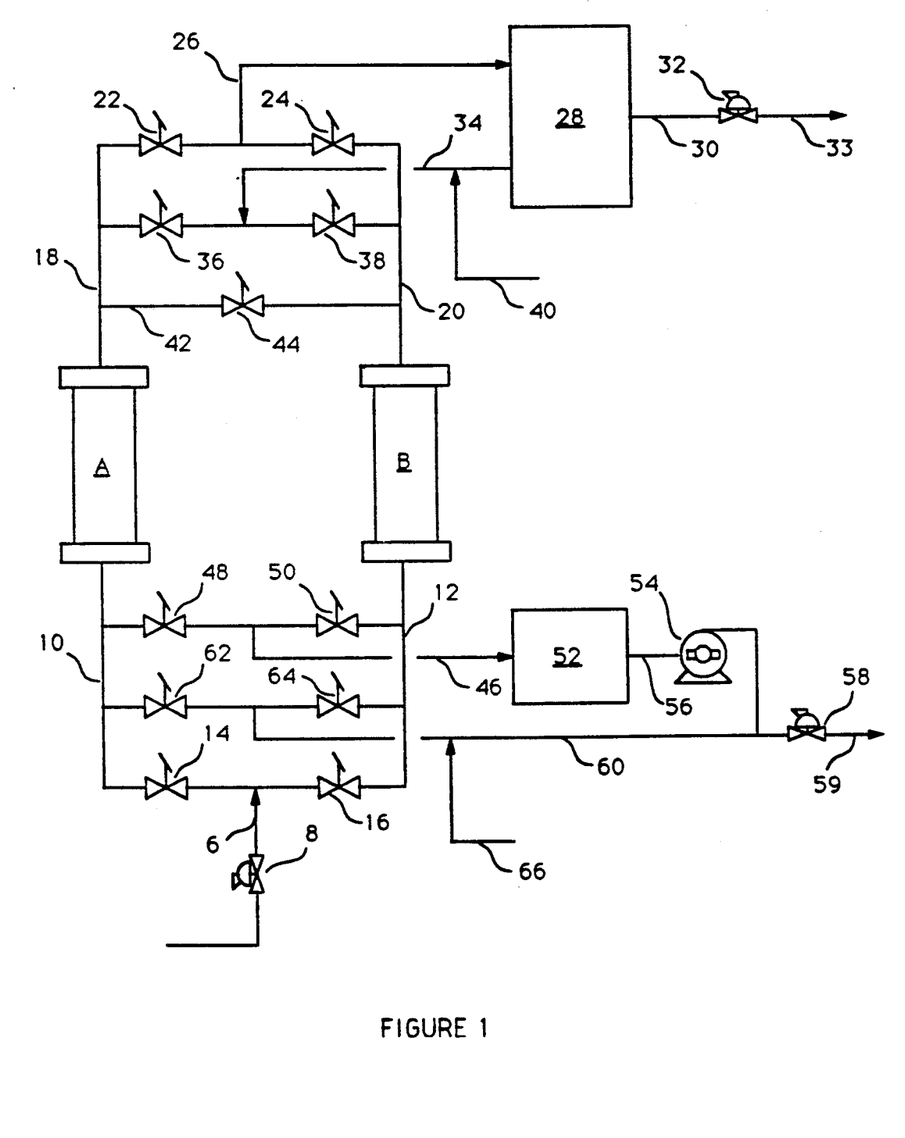
FIG. 1 is a diagrammatic view of one embodiment of a pressure swing adsorption system for recovering one or more preferentially adsorbable components from a gas mixture.

The process of the invention will be described as practiced in a two parallel bed adsorption system, although, as indicated above, it can be carried in a single bed system or in a battery of beds containing more than two beds. A preferred system for practicing the process of the invention is illustrated in FIG. 1. Referring now to FIG. 1, there is shown therein an adsorption system comprising parallel adsorption units A and B, each of which contains an adsorbent capable of selectively adsorbing one of the gaseous components of gas mixtures being treated in the system. Feed gas is provided to adsorbers A and B through feed gas line 6, which is fitted with flow control valve 8. Line 6 joins a feed gas source (not shown) to adsorption unit feed lines 10 and 12, which, in turn are connected to the feed inlet to adsorption units A and B, respectively. Lines 10 and 12 are respectively fitted with valves 14 and 16, so that feed gas can be alternately directed into adsorption units A and B. On their unadsorbed product outlet ends, adsorption units A and B are joined to unadsorbed product discharge lines 18 and 20. Lines 18 and 20 are fitted with valves 22 and 24, respectively, which provide for the selective removal of unadsorbed product gas from either one of adsorption units A and B. Lines 18 and 20 connect to line 26, which, in turn is connected to unadsorbed product reservoir 28. Unadsorbed product gas can be discharged to product storage or to the atmosphere, as desired, through line 30. Line 30 is under the control of flow control valve 32.

Unadsorbed product backfill gas can be provided to adsorbers A and B via line 34, which can be placed in fluid communication with lines 18 and 20 through valves 36 and 38, respectively. Alternatively, backfill from an external source can be provided through line 40, if desired.

The unadsorbed product end of adsorbers A and B can be placed in fluid communication through adsorber pressure equalization line 42. Flow of gas through line 42 can be effected by opening valve 44.

The system of FIG. 1 is provided with an adsorption unit evacuation line 46 so that desorbed product gas can be removed from adsorption units A and B. Line 46 communicates with lines 10 and 12, respectively, through valves 48 and 50. Line 46 is also connected to desorbed product gas reservoir 52. Vacuum pump 54 removes desorbed product gas from reservoir 52 via line 56 for transfer to desorbed gas storage through flow control valve 58 and line 59. Desorbed gas can also be returned to adsorbers A and B for purging purposes through line 60. Line 60 can be put into fluid communication with adsorption unit feed lines 10 and 12, respectively, through valves 62 and 64. Alternatively, purge gas can be provided to adsorbers A and B from an external source through line 66.

The process of the invention will be described as it applies to the recovery of methane in the apparatus of FIG. 1 from a methane-air mixture which contains methane at a concentration above the upper flammable mixture limit, which, at atmospheric pressure and 25° C., is about 14% methane by volume. The terms "cocurrent" and "cocurrently", as used in the description with respect to gases flowing through the adsorption bed, means flow towards the unadsorbed product gas outlet end from the feed gas inlet end, and the terms "countercurrent" or "countercurrently" means flow in the opposite direction, i.e. toward the feed gas end from the unadsorbed product gas outlet end.

The cycle for the most preferred embodiment of the process of the invention is shown in the following table.

TABLE I

| | MODE | |
|---|---|---|
| Step | Adsorber A | Adsorber B |
| 1 | Equalization | Equalization |
| 2 | Product backfill | Vacuum depressurization |
| 3 | Feed pressurization | Vacuum depressurization |
| 4 | Copurge/Production | Vacuum depressurization |
| 5 | Equalization | Equalization |
| 6 | Vacuum depressurization | Product backfill |
| 7 | Vacuum depressurization | Feed pressurization |
| 8 | Vacuum depressurization | Copurge/Production |

In the cycle set forth in Table I, the conditions under which steps 1, 2, 3 and 4 are carried out preferably equal to the conditions under which steps 5, 6, 7, and 8, respectively, are carried out. At the beginning of step 1, adsorber A has just completed the regeneration phase and adsorber B has just completed the production phase of the cycle. During step 1, valve 44 is open and all other valves of the system are closed. Expansion gas flows concurrently out of adsorber B, through line 42 and countercurrently into adsorber A, thereby partially pressurizing adsorber A. The purpose of this step is to conserve some of the pressure energy that is stored in the adsorber that has just completed production and to remove some of the relatively air-rich void space gas contained in adsorber B prior to the methane recovery step. Although this step is designated as an equalization step, it is not necessary that the step be continued until complete equalization between adsorbers A and B is effected.

Upon completion of step 1, valve 44 is closed, valves 36 and 50 are opened and vacuum pump 54 is actuated. Step 2, the product backfill step, begins and adsorber A now undergoes further Partial Pressurization by the countercurrent flow of product gas (air) from reservoir 28 through line 34, valve 36 and line 18 and into adsorber A. Simultaneously, the adsorbent in unit B is desorbed by the countercurrent evacuation of gas through line 12, valve 50, line 46 and into reservoir 52. The gas being evacuated from adsorber B generally contains 96% or more by volume methane. Some of this gas is transferred through flow control valve 58 and line 59 to methane product storage and the remainder of it is recycled to the adsorbers as purge gas. Flow through valve 58 is regulated to raise the pressure of the gas in line 60 to the desired adsorption unit operating pressure.

Upon completion of step 2, valve 50 is permitted to remain open, valve 36 is closed and valve 14 is opened as step 3 begins. All other valves remain closed during step 3. During this step, pressurization of adsorber A continues with the flow of fresh feed gas cocurrently into adsorber A through line 6, valves 8 and 14 and line 10 until the pressure in adsorber A reaches the desired operating pressure. Meanwhile, countercurrent evacuation of unit B continues in the manner described in the preceding step.

After adsorber A is fully pressurized, step 3 ends and step 4 begins. During step 4, valve 50 remains open, valves 22 and 62 are opened, and valve 14 is closed. All other valves remain closed. Desorbed product gas now flows through line 60, valve 62 and line 10 and enters adsorption unit A at the desired operating pressure. The desorbed product gas flowing cocurrently through adsorber A purges nonadsorbed gas from the inlet end of this unit and the adsorption front moves toward the nonadsorbed product outlet. As the methane front advances in adsorber A, nonadsorbed gas is forced from adsorber A through line 18. The gas initially exiting adsorber A is comprised substantially of air. This gas flows through valve 22 and line 26 and enters nonadsorbed product reservoir 28. When the adsorption front reaches the desired point in adsorber A, the flow of purge gas into adsorber A is terminated. The termination point is optimally near the nonadsorbed product gas outlet so that the adsorption system can be operated with maximum efficiency. Substantial breakthrough of methane from adsorber A is avoided so that the gas exiting this unit through the nonadsorbed gas outlet will not contain sufficient methane to constitute a flammable mixture. While adsorber A is undergoing purging and production, countercurrent vacuum depressurization of adsorber B continues. When this step is finished, the first half of the cycle of the process of the invention is completed.

The second half of the cycle is carried out by reversing the functions conducted on adsorbers A and B during steps 1-4 by manipulation of valves corresponding to the valves operated during the respective preceding steps. Thus, during step 5, only valve 44 is open and equalization gas flows from adsorber A to adsorber B; during step 6, only valves 38 and 48 are opened and vacuum pump 54 is actuated, and backfill gas flows into adsorber B while adsorber A undergoes vacuum depressurization; during step 7, only valves 16 and 48 are open, and adsorber B is pressurized to operating pressure with fresh feed gas while adsorber A continues to undergo vacuum desorption; and during step 8, only valves 24, 48, and 64 are open, and adsorber B undergoes the desorbed product purge and nonadsorbed product production step while adsorber A completes vacuum depressurization.

The above cycle is the most preferred operating cycle since it makes possible the production of a relatively high purity, i.e. at least 96% by volume pure, methane-enriched product stream as the desorbed gas product, while at the same time producing a waste air stream which contains as little as 3% by volume or less methane. The methane-rich gas stream can be safely stored or transported because it contains insufficient oxygen to render it flammable. The waste air stream can be released to the atmosphere, since it contains environmentally acceptable amounts of methane; it can be catalytically oxidized to convert the methane in the stream to carbon dioxide and water vapor; or it can be used for other purposes, for example as a dryer purge gas in the methane-enriched gas post purification operation described below.

As a variation of the above-described process, the cycle can be modified by eliminating the product backfill portion of steps 2 and 6. In this variation the pressurization formerly provided by the product backfill can be provided by extending the feed pressurization step. This embodiment is not as efficient as the preferred cycle since it results in the production of a less pure nonadsorbed gas stream, but where the purity of this stream is not critical this embodiment can be used to advantage when it is desirable to operate with a greater feed throughput.

In another modification of the preferred cycle, the feed pressurization steps (steps 3 and 7) can each be followed by short feed/production steps (steps 3A and 7A, respectively), during which the flow of feed gas into the adsorber is continued after the adsorber undergoing pressurization reaches the desired operating pressure, and nonadsorbed product is produced. Steps 3A and 7A are preferably of equal duration. During step 3A, valves 14, 22 and 50 are open and adsorber A is in the feed/production mode and adsorber B is undergoing vacuum depressurization; and during step 7A, valves 16, 24 and 48 are open and adsorber B is in the feed/production mode and adsorber A is undergoing vacuum depressurization. The effect of these modifications is to increase the feed gas throughput in the system, but lower the purity of the desorbed product. The reduction in desorbed product purity during the cycle of this embodiment is negligible if the total duration of step 3A does not exceed about 15% of the combined durations of steps 3 and 3A, and the total duration of step 7A does no exceed about 15% of the combined durations of steps 7 and 7A. In the preferred embodiment of this modification, the duration of step 3A and the duration of step 7A does not exceed about 10% of the combined durations of steps 3 and 3A and the combine durations of steps 7 and 7A, respectively. For example, if, in this embodiment, the duration of each of steps 3 and 7 is 17 seconds, the duration of each of steps 3A and 7A is not more than about 3 seconds, and preferably not more than about 2 seconds. As noted above, in the most preferred embodiment of the invention substantially all of the nonadsorbed product is produced during the purge/production steps of the cycle.

The cycle for the above-described embodiment of the process of the invention is shown in the following table.

TABLE II

| Step | MODE | |
|---|---|---|
| | Adsorber A | Adsorber B |
| 1 | Equalization | Equalization |

TABLE II-continued

| | MODE | |
|---|---|---|
| Step | Adsorber A | Adsorber B |
| 2 | Product backfill | Vacuum depressurization |
| 3 | Feed pressurization | Vacuum depressurization |
| 3A | Feed/Production | Vacuum depressurization |
| 4 | Copurge/Production | Vacuum depressurization |
| 5 | Equilization | Equilization |
| 6 | Vacuum depressurization | Product backfill |
| 7 | Vacuum depressurization | Feed pressurization |
| 7A | Vacuum depressurization | Feed/production |
| 8 | Vacuum depressurization | Copurge/Production |

In some cases it may be desirable to further purify the desorbed gas product of the adsorption cycle described above. For example, when a flammable gas such as methane is separated from an air-containing mixture by the adsorption process of the invention the methane-rich effluent from the adsorption system will contain up to about 5% by volume air. Since oxygen is present in air at a concentration of about 21% by volume, the methane-rich stream will then contain up to about 1% by volume oxygen. To meet pipeline product specifications it is often necessary to reduce the oxygen content of the gas stream to the parts per million level. This can be conveniently accomplished by the embodiment of the invention illustrated in FIG. 2. As was the case in describing the operation of the FIG. 1 system, it will be assumed that the feed gas stream being treated in the system of FIG. 2 is a methane-air mixture, but it is understood that the process disclosed therein can be used to remove oxygen from any gas stream which contains small amounts of oxygen.

Figure 2:
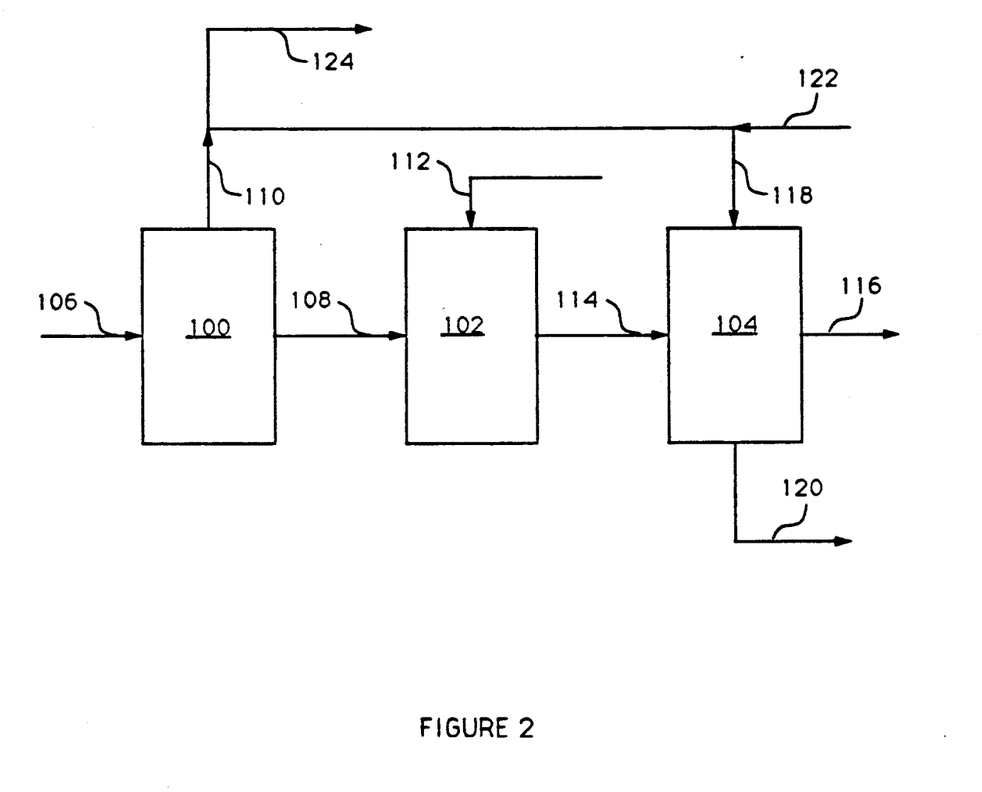
FIG. 2 is a diagrammatic view of a system for recovering one or more preferentially adsorbable components from a gas stream and subsequently deoxygenating the gas stream.

Referring now to FIG. 2, unit 100 is an adsorption plant such as the adsorption system illustrated in FIG. 1. Also included in the system of FIG. 2 are a catalytic deoxygenation unit 102 and a dehydration unit 104, which serves the purpose of removing water vapor and carbon dioxide (if present) from the gaseous effluent from unit 102. Unit 102 may contain a catalyst that promotes reaction between hydrocarbons and oxygen to produce water and carbon dioxide, or it may contain a catalyst which converts mixtures of hydrogen and oxygen into water, where it is desired to avoid the production of carbon dioxide. In the latter case, hydrogen may be introduced into reactor 102 through line 112. Unit 104 may contain an adsorption bed containing an adsorbent for water vapor and carbon dioxide, such as silica gel or alumina, or it may comprise other means for removing water from a gas stream, such as absorption means or a water condenser. The operation of the system of FIG. 2 will be described in detail as it applies to the removal of oxygen from a methane-air feed stream by the reaction of the oxygen with hydrogen to form water vapor and the subsequent removal of water vapor by adsorption from the gaseous effluent from unit 102.

The methane-air feed mixture entering unit 100 is separated therein in the manner described above into a methane-rich gas stream, which leaves unit 100 through line 108, and a nonadsorbed methane-lean stream, which leaves unit 100 through line 110. The methane-rich stream enters catalytic deoxygenator 102 wherein it contacts the catalytic bed at a predetermined temperature. Hydrogen is introduced into unit 102 through line 112 in an amount sufficient to combine with substantially all of the oxygen in the methane-rich stream to produce water. In preferred embodiments of the invention, a stoichiometric excess of hydrogen is used to ensure removal of substantially all of the oxygen in the feed stream. The effluent from catalytic deoxygenator 102 is comprised predominantly of methane, but it also contains nitrogen, excess hydrogen, water vapor, an perhaps trace amounts of unreacted oxygen. This mixture leaves unit 102 via line 114 and next enters unit 104.

As indicated above, in the preferred embodiment, unit 104 contains an adsorbent for water vapor. The adsorbent removes moisture from the methane-rich stream and the dried effluent leaves unit 104 via line 116 and is transferred to methane storage or distribution. The moisture is desorbed from the adsorbent by passing a dry purge gas stream over the adsorbent. The purge gas enters unit 104 via line 118 and leaves this unit through line 120, after which it can be discharged to the atmosphere or treated otherwise, if desired. The purge gas supplied to adsorber 104 can be the dry, nonadsorbed effluent gas leaving adsorber 100 through line 110 or it can be a external gas stream, provided through line 122. When an external gas is used it is preferably a dry inert gas, such as nitrogen. When the purge gas for adsorber 104 is externally provided, the nonadsorbed gas stream exiting unit 100 through line 110 can be vented to the atmosphere or otherwise disposed of through line 124.

The invention is further illustrated by the following examples, in which parts, percentages and ratios are on a volume basis, unless otherwise indicated. In the examples a gas mixture comprised of methane and nitrogen at the indicated concentrations was treated in a pair of adsorbers arranged in a system similar to that illustrated in FIG. 1. The adsorbers were 22 inches high and had an internal diameter of 1 1/16 inches and each had a volume of 0.79 liters (1). The adsorbers were packed with 12×40 mesh activated carbon, sold by ATOCHEM N. A. under the trade designation GAC 40. The feed gas was introduced into the adsorbers at a pressure of 19.7 psia and at room temperature, and the adsorption beds were evacuated to a pressure of about 3 psia.

EXAMPLE I

A gas mixture containing 71.5% methane and 28.5% nitrogen was treated in the adsorption system at a flow rate of 2.9 l/min. The cycle set forth in TABLE I was employed with the following schedule: Equalization - 10 secs.; Product backfill - 6 secs.; Feed pressurization - 14 secs; Purge/Production 15 secs; Equalization - 10 secs.; Vacuum depressurization 35 secs. No non-adsorbed product was produced during the feed pressurization step. The cycle was continued until steady state conditions were achieved (about 3 hours). The non-adsorbed product comprised 27.3% of the feed gas and contained 96.3% nitrogen and 3.7% methane, and the desorbed product comprised 72.7% of the feed gas and contained 97% methane and 3% nitrogen.

EXAMPLE II

The procedure of Example I was repeated except that the feed gas contained 70.8% methane and 29.2% nitrogen and its flow rate to the adsorbers was 3.2 l/min. and the following cycle was employed: Equalization - 12 secs.; Feed pressurization - 20 secs.; Feed/Production - 3 secs.; Purge/Production - 10 secs; Equalization - 12 secs.; Vacuum depressurization - 33 secs. The non-adsorbed product comprised of the feed gas and contained 99.2% nitrogen and 0.8% methane, and the desorbed product comprised 74% of the feed gas and contained 95.4% methane and 4.6% nitrogen.

EXAMPLE III (COMPARATIVE)

The procedure of Example I was repeated except that the feed gas contained 72.6% methane and 27.6% nitrogen and its flow rate to the adsorbers was 2.7 l/min. and the following cycle was employed: Equalization - 10 secs.; Product backfill -6 secs.; Feed pressurization - 11 secs.; Feed/Production 3 secs.; Purge/Production - 15 secs; Equalization - 10 secs.; Vacuum depressurization - 35 secs. The non-adsorbed product comprised 32.4% of the feed gas and contained 81.3% nitrogen and 18.7% methane, and the desorbed product comprised 67.6% of the feed gas and contained 98.4% methane and 1.6% nitrogen.

EXAMPLE IV (COMPARATIVE)

The procedure of Example I was repeated except that the feed gas contained 70.7% methane and 29.3% nitrogen and its flow rate to the adsorbers was 8.1 l/min. and the following cycle was employed: Feed pressurization - 18 secs.; Feed/Production - 12 secs.; Purge/Production - 15 secs; Vacuum depressurization - 45 secs. The non-adsorbed product comprised 32.9% of the feed gas and contained 65% nitrogen and 35% methane, and the desorbed product comprised 67.1% of the feed gas and contained 88.2% methane and 11.8% nitrogen.

The foregoing examples illustrate the advantages of the invention. In Example I, which represents the most preferred embodiment of the invention, i.e. no non-adsorbed product was produced during the period in which feed gas was introduced into the adsorbers, 98.6% of the methane introduced into the adsorbers was recovered in the desorbed product while only 1.4% of the methane was lost in the non-adsorbed product stream. In Example II, which also represents the process of the invention, 99.7% of the methane fed into the system was recovered in the desorbed product stream while only 0.3% of the methane was lost in the non-adsorbed stream. On the other hand, in Example III, in which non-adsorbed product was produced for more than 21% of the total period that feed gas was introduced into the system, 8.4% of the methane that was introduced into the system was lost in the non-adsorbed product stream, and in Example IV, in which non-adsorbed product was produced for 40% of the total period that feed gas was introduced into the system, 16.3% of the methane that was introduced into the system was lost in the non-adsorbed product stream.

Although the invention has been described with reference to specific examples, it is understood that variations of these are contemplated. For example, the invention can be used to treat hydrocarbon streams from other sources, such as oil wells and chemical Process units or it can be used to separate gases that do not form a flammable mixture. The scope of the invention is limited solely by the breadth of the appended claims.

What is claimed is:

1. A process for producing a gaseous first component-enriched product and a gaseous first component-depleted product from a gaseous feed mixture by pressure swing adsorption in an adsorber that contains an adsorbent which adsorbs said first component in preference to other components of said feed mixture comprising:
   (a) partially pressurizing said adsorber by countercurrently flowing cocurrent depressurization gas obtained from step (g) into said adsorber;
   (b) further partially pressurizing said adsorber by countercurrently flowing first component-depleted product into said adsorber;
   (c) further pressurizing said adsorber to production pressure by cocurrently flowing said feed mixture into said adsorber;
   (d) cocurrently flowing said feed mixture into said adsorber at said production pressure while cocurrently withdrawing first component-depleted product from said adsorber, the duration of this step (d) being in the range of 0% to about 15% of the combined durations of steps (c) and (d);
   (e) cocurrently flowing first component-enriched product into said adsorber at said production pressure while cocurrently producing first component-depleted product;
   (f) stopping the flow of first component-enriched product into said adsorber when the first component front reaches the desired point in said adsorber;
   (g) partially cocurrently depressurizing said adsorber thereby producing said cocurrent depressurization gas;
   (h) further countercurrently depressurizing said adsorber thereby regenerating said adsorbent and producing said first component-enriched product;
   (i) repeating steps (a) to (h).

2. The process of claim 1, wherein the duration of step (d) does not exceed about 10% of the combined durations of steps (c) and (d).

3. The process of claim 1, wherein no first component-depleted product is withdrawn from said adsorber during step (d).

4. The process of claim 1, wherein said gaseous feed mixture contains air.

5. The process of claim 4, wherein said gaseous feed mixture contains one or more hydrocarbons containing 1 to 5 carbon atoms.

6. The process of claim 1, wherein said gaseous feed mixture comprises nitrogen and one or more hydrocarbons containing 1 to 5 carbon atoms.

7. The process of claim 1, wherein said gaseous feed mixture comprises nitrogen and methane.

8. The process of claim 1, wherein said feed gas contains oxygen and said first component-enriched product is further purified by catalytically reacting the oxygen with hydrogen to produce water, and subsequently removing the water from the first component-enriched product.

9. The process of claim 8, wherein the water is removed from the first component-enriched product by adsorption.

10. A process for separating a gaseous feed mixture containing a flammable component at a concentration greater than the upper flammable mixture limit and oxygen into a flammable component-depleted product having a flammable component concentration less than the lower flammable mixture limit and a flammable component-enriched product by pressure swing adsorption in an adsorption bed which adsorbs said flammable component in preference to other components of said feed mixture by repeatedly performing the following steps:

(a) partially pressurizing said adsorption bed by countercurrently flowing cocurrent depressurization gas obtained from step (g) into said adsorption bed;

(b) further partially pressurizing said adsorption bed by countercurrently flowing into said adsorption bed a nonflammable gas stream comprised predominantly of components that are less adsorbable by said adsorbent than is said flammable component;

(c) further pressurizing said adsorption bed to production pressure by cocurrently flowing said gaseous feed mixture into said adsorption bed;

(d) cocurrently flowing said gaseous feed into said adsorber at said production pressure while cocurrently withdrawing flammable component-depleted product from said adsorber, the duration of this step (d) being in the range of 0% to about 15% of the combined durations of steps (c) and (d);

(e) cocurrently flowing into said adsorption bed a gas stream which contains said flammable component at a concentration greater than the concentration of said flammable mixture in said feed mixture and which is at production pressure while cocurrently flowing said flammable component-depleted product from said adsorption bed;

(f) stopping the flow of the gas stream of step (e) into said adsorption bed when the flammable component front reaches the desired point in the adsorption bed;

(g) cocurrently partially depressurizing said adsorption bed, thereby producing said cocurrent depressurization gas;

(h) countercurrently further depressurizing said adsorption bed, thereby regenerating said adsorption bed and producing said flammable component-enriched product.

11. The process of claim 10, wherein the duration of step (d) does not exceed about 10% of the combined durations of steps (c) and (d).

12. The process of claim 10, wherein the flow of gaseous feed mixture into said adsorption bed is discontinued when said production pressure is attained in said adsorption bed;

13. The process of claim 10, wherein the nonflammable gas stream in step (b) is flammable component-depleted product.

14. The process of claim 10, wherein the gas stream in step (e) is flammable component-enriched product.

15. The process of claim 13, wherein the gas stream in step (e) is flammable component-enriched product.

16. The process of claim 10, wherein said flammable component comprises one or more hydrocarbons.

17. The process of claim 16, wherein said one or more hydrocarbons contain 1 to 5 carbon atoms.

18. The process of claim 17, wherein said one or more hydrocarbons are is selected from methane, ethane, ethylene, propane, propylene and mixtures of these.

19. The process of claim 18, wherein said hydrocarbon is methane.

20. The process of claim 10, wherein said gaseous feed mixture comprises air.

21. The process of claim 10, wherein said gaseous feed mixture consists substantially of methane and air.

22. The process of claim 13, wherein said flammable component-enriched product is further purified by catalytically reacting residual oxygen contained therein with hydrogen to produce water, and subsequently removing the water from the resulting product.

23. The process of claim 22, wherein the water is removed by adsorption.

24. The process of claim 13, wherein said flammable component-enriched product is further purified by catalytically reacting residual oxygen contained therein with said one or more hydrocarbons to produce water and carbon dioxide, and subsequently removing the water and carbon dioxide from the resulting product.

25. The process of claim 24, wherein the water and carbon dioxide are removed by adsorption.

26. A process for separating a gaseous feed mixture containing methane at a concentration greater than the upper flammable mixture limit and oxygen into a gaseous methane-depleted product having a methane concentration less than the lower flammable mixture limit and a gaseous methane-enriched product by pressure swing adsorption in an adsorber which contains an adsorbent which adsorbs methane in preference to other components of said feed mixture by repeatedly performing the following steps:

(a) partially pressurizing said adsorber by countercurrently flowing a methane-lean gas into said adsorber;

(b) further pressurizing said adsorber by cocurrently flowing said feed gas mixture into said adsorber without concurrently withdrawing product gas therefrom;

(c) discontinuing the flow of feed gas mixture into said adsorber when production pressure is attained in said adsorber;

(d) cocurrently flowing methane-enriched product at production pressure into said adsorber while simultaneously cocurrently flowing methane-depleted product from said adsorber;

(e) stopping the flow of methane-enriched product into said adsorber when the methane front reaches the desired point in said adsorber;

(f) cocurrently partially depressuring said adsorber;

(g) countercurrently further depressurizing said adsorber, thereby producing said methane-enriched product.

27. The process of claim 26, wherein said methane-lean gas is effluent obtained from the adsorber during step (f)

28. The process of claim 26, wherein said methane-lean gas is methane-depleted gas produced during step (e).

29. The process of claim 26, wherein said methane-lean gas is air.

30. The process of claim 26, wherein said methane-enriched product is further purified by catalytically reacting residual oxygen contained therein with hydrogen to produce water, and subsequently removing the water from the resulting product.

31. The process of claim 30, wherein the water is removed by adsorption.

32. The process of claim 26, wherein said methane-enriched product is further purified by catalytically reacting residual oxygen contained therein with methane to produce water and carbon dioxide, and subsequently removing the water and carbon dioxide from the resulting product.

33. The process of claim 32, wherein the water and carbon dioxide are removed by adsorption.

34. In a cyclical multi-step process for producing a gaseous first component-enriched product and a gaseous first component-depleted product from a gaseous feed mixture by pressure swing adsorption in an adsorber that contains an adsorbent which adsorbs said first component in preference to other components of said feed mixture, the improvement wherein the process includes the sequential steps of:
  (a) pressurizing said adsorber to production pressure by cocurrently flowing said feed mixture into said adsorber without concurrently withdrawing product gas therefrom;
  (b) terminating the flow of feed mixture into said adsorber when production pressure is attained;
  (c) cocurrently flowing first component-enriched product into said adsorber at production pressure until the first component front reaches the desired point in said adsorber while simultaneously cocurrently withdrawing first component-depleted product from said adsorber.
  (d) partially cocurrently depressurizing said adsorber;
  (e) further countercurrently depressurizing said adsorber thereby regenerating said adsorbent and producing said first component-enriched product;

35. The improved process of claim 34 wherein step (a) is preceded by the step of partially pressurizing said adsorber by countercurrently flowing into said adsorber a gas stream selected from first component-depleted product produced in step (b) and the gas produced in step (c).

36. The improved process of claim 34 wherein step (a) is preceded by partially pressurizing said adsorber by sequentially countercurrently flowing into said adsorber gas Produced in step (c) and first component-depleted product produced in step (b).

37. The process if claim 31, wherein the adsorbent used in said adsorption is silica gel, alumina, zeolite, activated carbon or mixtures of these.

* * * * *